Aug. 17, 1943.    E. J. O'KEEFE    2,327,058
INSTRUMENT FOR ESTABLISHING POINTS FOR DRAWINGS
Filed Oct. 28, 1942    3 Sheets-Sheet 1

INVENTOR
Edward J. O'Keefe
BY G. Ward Kemp
ATTORNEY

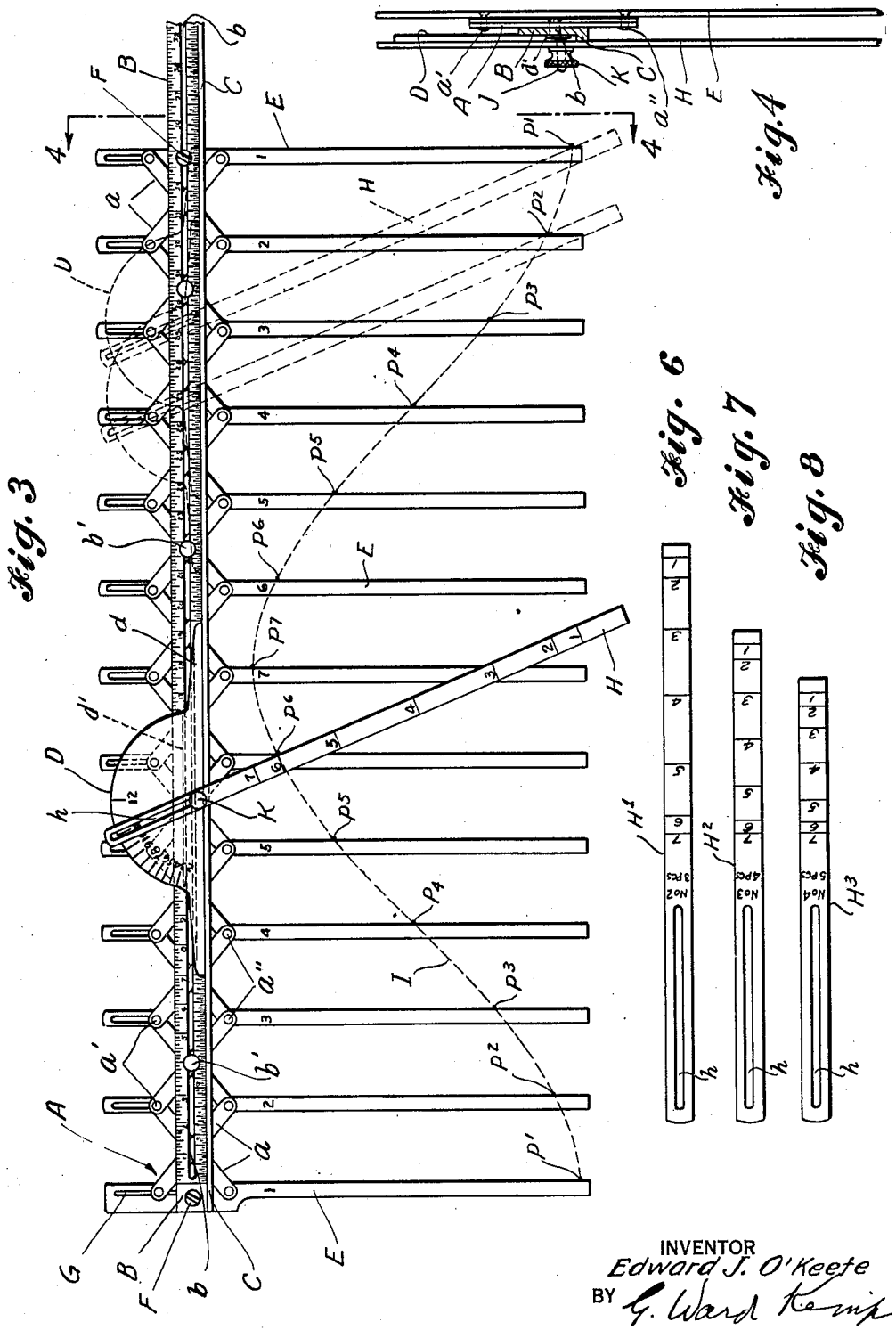

Aug. 17, 1943.  E. J. O'KEEFE  2,327,058
INSTRUMENT FOR ESTABLISHING POINTS FOR DRAWINGS
Filed Oct. 28, 1942  3 Sheets-Sheet 3
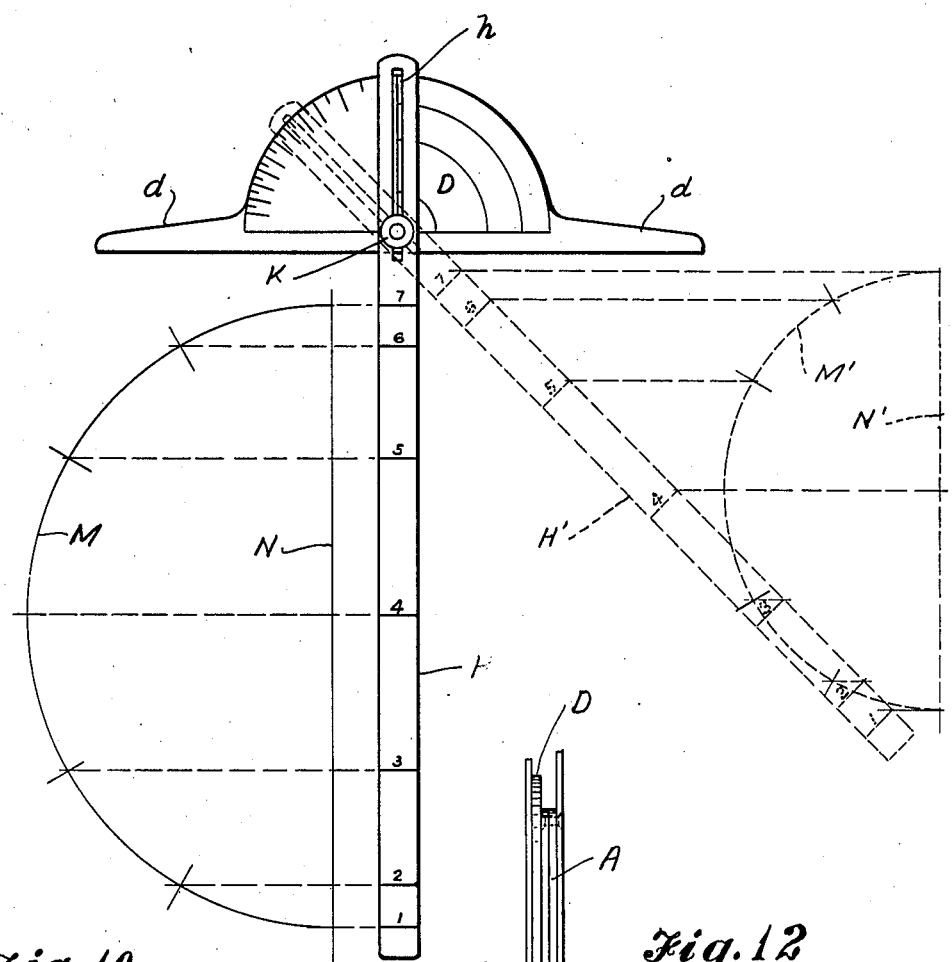
Fig. 9
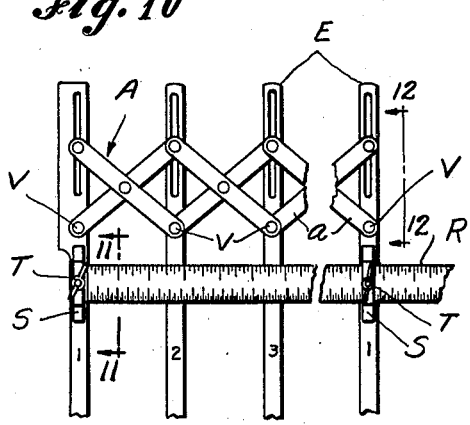
Fig. 10
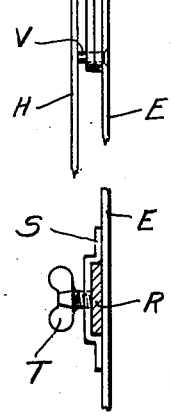
Fig. 12
Fig. 11
INVENTOR
Edward J. O'Keefe
BY G. Ward Kemp
ATTORNEY Patented Aug. 17, 1943

2,327,058

UNITED STATES PATENT OFFICE 2,327,058

INSTRUMENT FOR ESTABLISHING POINTS FOR DRAWINGS

Edward J. O'Keefe, Seattle, Wash.

Application October 28, 1942, Serial No. 463,708

3 Claims. (Cl. 33—75)

This invention relates to instruments for determining points and for laying out lines for drawings for angle joints, and particularly for laying out lines for cutting sheet metal fittings consisting of parallel forms.

The objects of the invention are to provide an instrument for accurately determining or fixing points on drawings, or on plates, for establishing lines for cutting the plates suitably for forming elbows, T joints, etc., with greater speed and accuracy than can be done by hand measurements, or other known instruments. Further and particular objects are to provide such an instrument with a plurality of parallel and perpendicularly disposed bars for horizontal adjustment, for determining the width of spaces between the same. The bars being preferably pivotally connected to lazy tongs, and a dial plate guided adjacent and in relation to the tongs carries an arm swingingly disposed over the bars for determining points along the same perpendicularly one above the other, for fixing points to be marked for curved lines on the face of the drawing or plate to be cut, for forming sheet metal structures.

With these and other objects to be hereinafter stated, I have illustratively exemplified my invention by the accompanying drawings, of which:

Figure 1 indicates for illustration a form of elbow joint laid out by the instrument.

Figure 3 shows a plan view of the instrument in position over a surface to be marked with a dotted curved line and points along the line as determined by the instrument, for illustration.

Figure 4 shows an end view of the instrument with a rule in section, taken on line 4—4 on Fig. 3.

Figure 1:
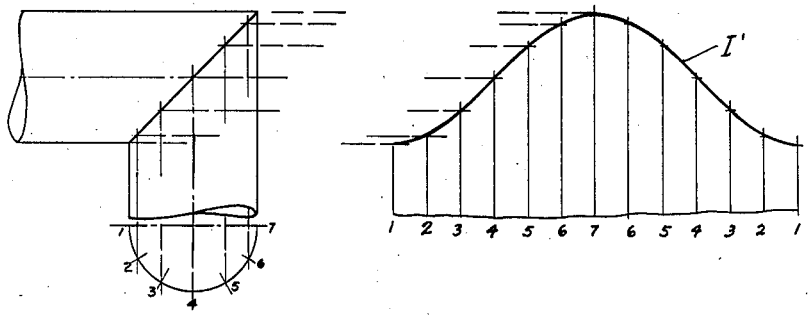

Figures 6, 7 and 8 indicate alternate forms of arms.

Figure 9 is an enlarged view of the dial plate and arm over diagrammatic lines to show the method of determining positions of the numerals on the arm.

Figure 10 is a fragmentary view of an alternate form of rule and means for connecting the same with the tongs.

Figure 11 is an end view of parts shown in Fig. 10, taken on line 11—11 of Fig. 10.

Figure 12 shows alternate means for guiding the dial plate.

Like characters on the different figures represent like parts.

The letter A represents generally the lazy tongs, formed with links $a$, connected by pivots $a'$ and $a''$. B represents a flat rule, preferably provided with a longitudinal slot $b$ along the center thereof, for disposition of guide pins $b'$ which are slidably disposed therethrough and connected to the tongs for maintaining the tongs and rule in alignment. The rule is preferably provided with an upturned flange C along the lower margin thereof for guiding the base of a semicircular dial plate D, and for convenience the upper margin of the rule may carry graduations and numerals for diameter measurements, and the lower margin, graduations and numerals for determining circumferences.

E represents a plurality of bars, preferably thirteen in number, which are connected by the pins $a'$ and $a''$ pivotally, and at right angles to the tongs. The lower portions of the bars are projected in spaced relation with each other below the rule, for determining the width of spaces between the marks to be fixed on the drawings for lines. The two outer bars each marked $l$ are adjustably connected to the rule, preferably by binding bolts or screws F, for retaining the bars and lazy tongs in positions for spacing. Slots G in the upper ends of the bars permit the pin $a'$ to slide and the tongs to be collapsed and expanded, for adjusting the spaces.

H represents the arm for establishing points, along any desired line, which on Fig. 3 is indicated by curved dotted line I. The arm is provided with a slot $h$, in the upper portion thereof in which a binding bolt J is slidably and rotatably positioned, for adjustment of the position of lower portion of the arm across the bars as may be desired. The bolt is attached to the plate, and is provided with a nut K for binding the arm in desired positions. The dial plate is provided with a series of numerals on the face thereof, which may be viewed severally through the top of the slot for determining the positions for setting the arm. The arm shown in Fig. 3 is provided with a series of seven numerals along the lower portion thereof, beginning with 1 near the lower end and continuing in predetermined spaced relation upward to the 7, for determining the positions for the arm to cross in conjunction with the bars. The thirteen bars shown in Fig. 3 are proper for laying out elbows and provide twelve equal spaces, corresponding with the diameter of such elbows to be formed. The bars are respectively numbered from the right and left to center, beginning with 1 and continuing 2, 3, 4, 5, 6 up to the central bar marked 7.

Figure 5:
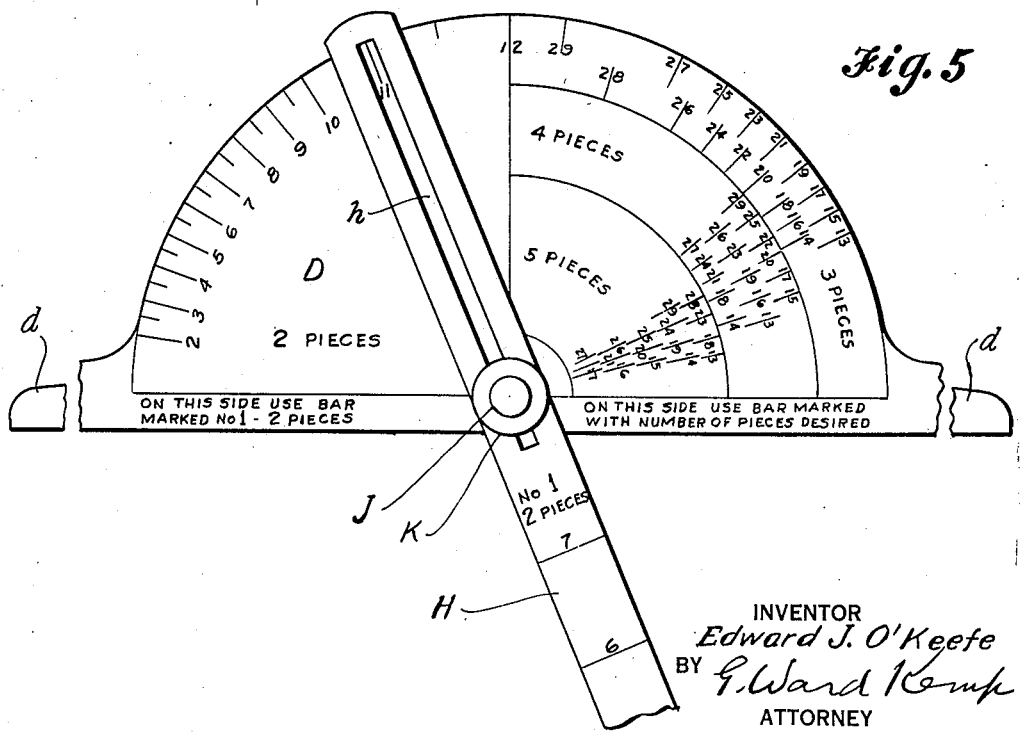
Figure 5 shows an enlarged view of the dial plate, with sets of numerals thereon, and the upper portion of the arm pivotally connected therewith for adjustment over the numerals.

The markings of numerals 1 to 7 shown in Figs. 3 and 5 are determined by first drawing a twelve inch semicircle illustrated as M in Fig. 9, and dividing it into six equal spaces or parts, and placing the arm parallel with the base N of the semicircle, and projecting the spaces of the semicircle upon the arm, which will determine the correct margins of the spaces on the arm; and then marking upon the arm at the margin lines of the spaces, the proper numerals 1 to 7; then slanting the arm to positions indicated by dotted lines H', which shortens the diameter N' of the semicircle as M' but does not change the spacing—thereby making it possible to develop any mitre line for a fitting made up of parallel forms having a rise not greater than twelve inches. In general it may be stated that the positions of the numerals on the arm are arranged, to produce points, for a mitre line on the surface of a drawing or sheet of metal to be used for forming a cylinder.

Figures 10 and 11 show means for operating a similar instrument, but formed with a simplified rule, as R, without a central slot, or flange, for guiding the dial plate. In this construction, the rule may be connected to the outer bars by bracket clamps S, affixed to the bars, through which the rule may slide as the lazy tongs are collapsed or expanded for spacing the bars. When the desired positions of the bars are determined, the rule may be locked by use of set screws T, through the brackets. In use the dial plate may be adjusted along the upper edge of this rule, between the set screws.

For some work the lower pivot pins $a''$ for the tongs may be extended forward shown as V in Fig. 12, and the dial plate guided upon the same without any rule. In such cases the pins should fit tight enough to normally prevent the tongs from shifting in use.

In use, in laying out lines for cutting an elbow such as indicated in Fig. 1, with the ends having a diameter of 11 inches, the instrument shown in Figs. 3 and 5, is placed over the surface to be marked, and the slot $h$, in top of the arm is positioned over the numeral 11 on left hand side of the dial plate, and the arm then tightened against the dial plate. The dial and arm are then moved along the rule till the numeral 1 on lower end of the arm crosses the bar No. 1 on right hand side, and the operator then marks a point as $p1$ at the conjunction of the arm and bar. The plate and arm are than moved till the numeral 2 crosses the next bar No. 2, and indicator point there marked as $p2$, and so on till the point $p7$ on central bar 7 is marked. The plate and arm are moved further till the arm crosses the bar 6 left of the center, and the point of conjunction there marked $p6$, and following in same manner marking the left bars respectively $p5$ and down to $p1$ at conjunction with left bar No. 1. In order to so mark the last three of said left hand bars the central body of the plate must be moved along beyond the end of the rule, but the plate may be still guided on the same plane, by the support of the extension $d$, of the plate against the flange on the rule. (Instead of so moving the plate beyond the rule, in some cases it would be possible to reset the arm on the plate.) A groove $d'$ on back of the plate provides clearance for the pins $b'$ and the screw head F. When these several points have been so marked along the track of the desired curve, the completed line may be filled in by pencil or pen between such points, and the sheet of metal may be then cut to conform with such curved line, for forming the elbows, etc.

In order to suitably establish marks for a line for constructing an elbow with tubular ends of 10 inch diameters, the slot $h$, of the arm is set over the numeral 10 on left side of the plate, and the lazy tongs compressed, then the several positions of the crossing of the arm and bars may be marked accordingly. For a 9 inch elbow diameter, the slot is set over the numeral 9 on the dial plate, etc. It will be understood that where diameters are to be greater than for the 11 inch shown in Fig. 3, that the spaces between the bars will be increased, and when the diameters are to be less than the 11 inch shown, the spaces will be decreased.

Where it is necessary to lay out lines for elbows to be formed from more than two sections or pieces of sheet metal, different schedules of numerals must be shown on the dial, as by increasing number of pieces used to form elbows of like diameters, the height of the curve to be established is diminished. For this purpose the right half of the dial is provided with additional numerals for forming elbows with more than two pieces and with diameters exceeding 12 inches, and up to 29 inches. Accordingly, the outer division of numerals on the right hand of the dial in Fig. 5 are suitably arranged for determining points on the paper with the same arm for three pieces. The next division, shows numerals arranged for determining points for use of four pieces, and third division, shows numerals for determining points for five pieces. Additional sets of numerals may be supplied for determining points for elbows with still more pieces. In order to lay out or establish the points for line to be cut, the slot in the arm is set over the numeral on the dial corresponding with the diameter to be formed as before described.

Figure 2:
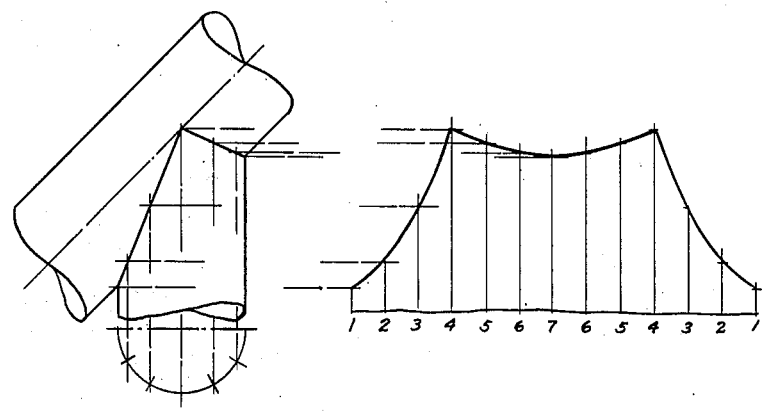
Figure 2 represents another form of structure with a 45 degree mitre line—that may be laid out by the instrument, for illustration.

In some instances it may be necessary to lay out elbows to be formed with more than two pieces, where the numerals on the dial are not suitable, or easily arranged thereon, and in such cases, alternate forms of arms may be used with the dial in similar manner, with the numerals on the arms suitably spaced as may be desired, as illustrated in Figs. 6, 7 and 8, designed for laying out elbows of 2 to 12 inches in diameter, or 3, 4 and 5 pieces respectively. The instrument may be used for laying out drawings and work for many different kinds of joints other than as illustrated in Figs. 1 and 2, as will be understood by those skilled in the art.

Having described my invention I claim as new:

1. An instrument for establishing points for curved lines for laying out angle joints for sheet metal fittings, comprising lazy tongs, a plurality of bars pivotally connected to the tongs and extended below the same at right angles for determining widths of spaces over the surface to be marked, a rule adjustably connected to the tongs for retaining the bars in predetermined spaced relation with each other, the rule provided with a longitudinal slot, pins extended from the lazy tongs and slidably disposed through the slot for maintaining the rule and tongs in parallel relation, a dial plate slidably disposed over the rule provided with predetermined sets of numerals upon the upper portion thereof, an upturned flange along the lower margin of the rule for guiding and sustaining the plate in alignment with the rule, an arm pivotally mounted upon the plate and provided with a slot in the upper portion thereof for adjustment over the plate and for setting the arm in predetermined positions over the numerals thereon, the lower portion of the arm swingingly disposed beneath the rule for disposition over the bars, numerals marked upon the lower portion of the arm in predetermined spaced relation one above the other for determining positions for the arm in conjunction with the bars, for establishing the points to be marked along a predetermined curved line for forming angle joints.

2. An instrument for establishing points for curved lines for forming angle joints for sheet metal fittings, comprising, lazy tongs, a plurality of bars pivotally connected to the tongs and extending at right angles below the same, a rule adjustably connected to the tongs for maintaining the bars in predetermined spaced relation with each other and for guiding a dial plate thereover, a dial plate slidably mounted over the rule, numerals disposed upon the upper portion of the plate, an arm pivotally mounted upon the lower portion of the plate and provided with a slot in the upper portion thereof to facilitate the setting over the numerals, and the lower portion of the arm swingingly disposed over the bars and provided with numerals disposed in spaced relation perpendicularly thereon, for determining places to be marked on a surface at the conjunction points with the bars for laying out a line to be guided by the marks so established.

3. An instrument for establishing points for curved lines on a surface to be marked, comprising, a plurality of bars in parallel positions with each other, for establishing points to be marked at predetermined distances from each other on the surface, lazy tongs pivotally connected with the bars for adjusting the spaces between the same, a dial plate slidably disposed adjacent the tongs with numerals thereon and an arm pivotally connected to the dial plate and the lower end of the arm swingingly mounted over the lower portions of the bars for establishing positions to be marked on the surface at the junction points of the arm with the several bars.

EDWARD J. O'KEEFE.